United States Patent
Yoshino

(10) Patent No.: US 12,504,733 B2
(45) Date of Patent: Dec. 23, 2025

(54) TAP PHASE DETECTION METHOD, FEMALE THREAD PROCESSING METHOD IN MACHINE TOOL, AND MACHINE TOOL

(71) Applicant: OKUMA CORPORATION, Niwa-Gun (JP)

(72) Inventor: Kiyoshi Yoshino, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 553 days.

(21) Appl. No.: 17/936,980

(22) Filed: Sep. 30, 2022

(65) Prior Publication Data

US 2023/0113347 A1  Apr. 13, 2023

(30) Foreign Application Priority Data

Oct. 13, 2021 (JP) .................. 2021-168350

(51) Int. Cl.
 G05B 19/18 (2006.01)
 B23G 3/08 (2006.01)
 G01B 11/24 (2006.01)

(52) U.S. Cl.
 CPC ............. G05B 19/182 (2013.01); B23G 3/08 (2013.01); G01B 11/2425 (2013.01)

(58) Field of Classification Search
 CPC .... G05B 19/182; B23G 3/08; B23G 2240/36; B23G 2240/52; B23G 1/18; G01B 11/2425
 See application file for complete search history.

(56) References Cited

U.S. PATENT DOCUMENTS

| | | | | |
|---|---|---|---|---|
| 6,111,601 A | * | 8/2000 | Adachi | G01B 11/2433 348/137 |
| 2008/0049235 A1 | * | 2/2008 | Crowther | G01B 11/2425 356/601 |
| 2017/0284794 A1 | * | 10/2017 | Hidaka | G01B 11/2425 |
| 2019/0337067 A1 | * | 11/2019 | Hughey | B23G 1/18 |
| 2021/0132567 A1 | * | 5/2021 | Kasai | G05B 19/4065 |
| 2021/0372827 A1 | * | 12/2021 | Loecklin | G01D 5/34792 |
| 2022/0161341 A1 | * | 5/2022 | Maeda | B23G 1/18 |
| 2022/0178399 A1 | * | 6/2022 | Finlay | G01P 13/00 |

FOREIGN PATENT DOCUMENTS

| | | |
|---|---|---|
| JP | 2015-039762 A | 3/2015 |
| JP | 2019-093478 A | 6/2019 |

* cited by examiner

*Primary Examiner* — Rami R Okasha
(74) *Attorney, Agent, or Firm* — BURR PATENT LAW, PLLC

(57) ABSTRACT

A tap phase detection method includes: acquiring a relation between a rotation angle and an existence of a screw thread by measuring a position of the screw thread of a tap with a sensor from a direction intersecting with an axial direction of the tap while rotating the tap; and detecting a phase of the tap based on the acquired relation between the rotation angle and the existence of the screw thread.

7 Claims, 7 Drawing Sheets

TAP PHASE DETECTION METHOD, FEMALE THREAD PROCESSING METHOD IN MACHINE TOOL, AND MACHINE TOOL

CROSS REFERENCE TO RELATED APPLICATION

This application claims the benefit of Japanese Patent Application Number 2021-168350 filed on Oct. 13, 2021, the entirety of which is incorporated by reference.

FIELD OF THE INVENTION

The disclosure relates to a phase detection method for a tap used for performing female thread processing and the like by a machine tool, a female thread processing method using the method, and a machine tool configured to execute the processing method.

BACKGROUND OF THE INVENTION

In processing using a tap as a tool for forming a female thread to a material to be worked, a trouble of a breakage of the tap often occurs. When the female thread processing is performed by a large number of times, since a cutting edge of the tap is gradually worn, a cutting load increases, and the tap is broken when the cutting load exceeds an allowable load of the tap. While a method in which the cutting load is monitored to stop the female thread processing is employed to avoid the breakage of tap in some cases, there is a problem in that when the female thread processing is halted and the tap is retreated, it is difficult to continue the female thread processing with a new tap. The reason is because since the female thread processing is performed by synchronizing an axis feed with a rotation phase of the tap, it is necessary to match a protruding length of the tool and the phase between the retreated tap and the new tap to process the female thread processed halfway with the new tap.

For the protruding length of a tool, a contact type device and a non-contact device using a laser light for measuring the length of a tool have become popular, and the protruding length of a tool can be easily corrected from a measurement value. Meanwhile, for the phase, there has been proposed a method for determining phases of a tap and a tool holder. For example, JP 2015-39762 A discloses a tap installation device that installs a tap to a tap holder using a ring gauge and a height gauge with predetermined phase and protruding length. JP 2019-93478 A discloses a processing method in which relative positions of a tap and a workpiece are set using a setting gauge.

However, in the methods disclosed in JP 2015-39762 A and JP 2019-93478 A, since the phase determination of the tap and the tool holder is performed using the dedicated devices, there is a problem with versatility. Additionally, since it is assumed that a sequence of the phase determination operations is performed of an operator, there is a problem in that the automation is difficult.

Therefore, the disclosure has been made in consideration of the problems, and an object of which is to provide a method for detecting a tap phase with a facilitated method without using a dedicated device.

Another object of the disclosure is to provide a female thread processing method in a machine tool configured to perform processing continuously to halted female thread processing using the tap phase detection method, and a machine tool.

SUMMARY OF THE INVENTION

In order to achieve the above-described objects, a first configuration of the disclosure is a tap phase detection method. The method includes: acquiring a relation between a rotation angle and an existence of a screw thread by measuring a position of the screw thread of a tap with a sensor from a direction intersecting with an axial direction of the tap while rotating the tap; and detecting a phase of the tap based on the acquired relation between the rotation angle and the existence of the screw thread.

In another aspect of the first configuration of the disclosure, which is in the above configuration, the sensor includes a laser light irradiation device that emits a laser light to a position of the screw thread and a laser light detection device that detects the emitted laser light.

In order to achieve the above-described objects, a second configuration of the disclosure is a female thread processing method in which halted female thread processing is continuously performed with a tap mounted to a main spindle of a machine tool. The method includes: a reference phase acquisition step of preliminarily acquiring a relation between a rotation angle of the main spindle and an existence of a screw thread of a reference tap as a tap before the halt by mounting the reference tap to the main spindle, and measuring a position of the screw thread of the reference tap with a sensor from a direction intersecting with an axial direction of the reference tap while rotating the main spindle; a measurement phase acquisition step of acquiring a relation between a rotation angle of the main spindle and an existence of a screw thread of another tap for continuing the female thread processing by mounting the other tap to the main spindle and measuring a position of the screw thread of the other tap with the sensor while rotating the main spindle; a phase difference calculation step of calculating a phase difference between the reference tap and the other tap based on the relation between the rotation angle and the existence of the screw thread acquired in the reference phase acquisition step and the relation between the rotation angle and the existence of the screw thread acquired in the measurement phase acquisition step; and a processing step of setting a start position for rotating the main spindle to which the other tap is mounted based on the phase difference, and continuously performing the female thread processing from the start position.

In another aspect of the second configuration of the disclosure, which is in the above configuration, in the processing step, the phase difference calculated in the phase difference calculation step is set as a phase correction amount, and the main spindle is rotated having a rotation angle shifted by the phase correction amount from a rotation halted angle of the main spindle in the halted female thread processing as the start position.

In another aspect of the second configuration of the disclosure, which is in the above configuration, in the processing step, based on a processing start main spindle phase in a processing program of a control device of the machine tool in the halted female thread processing and the phase difference calculated in the phase difference calculation step, a new processing start main spindle phase is set to the processing program, and the main spindle is rotated having the new processing start main spindle phase as the start position.

In another aspect of the second configuration of the disclosure, which is in the above configuration, the sensor includes a laser light irradiation device that emits a laser light to a position of the screw thread and a laser light detection device that detects the emitted laser light.

In order to achieve the above-described objects, a third configuration of the disclosure is a machine tool for continuously performing halted female thread processing with a tap mounted to a main spindle. The machine tool includes a sensor, a reference phase acquisition unit, a measurement phase acquisition unit, a phase difference calculation unit, and a processing unit. The sensor is configured to measure a position of a screw thread of the tap from a direction intersecting with an axial direction of the tap mounted to the main spindle. The reference phase acquisition unit acquires a relation between a rotation angle of the main spindle and an existence of the screw thread by measuring a position of a screw thread of a reference tap as a tap before the halt with the sensor while rotating the main spindle in a state where the reference tap is mounted to the main spindle. The measurement phase acquisition unit acquires a relation between a rotation angle of the main spindle and an existence of a screw thread by mounting another tap for continuing the female thread processing to the main spindle and measuring a position of the screw thread of the other tap with the sensor while rotating the main spindle. The phase difference calculation unit calculates a phase difference between the reference tap and the other tap based on the relation between the rotation angle and the existence of the screw thread acquired by the reference phase acquisition unit and the relation between the rotation angle and the existence of the screw thread acquired by the measurement phase acquisition unit. The processing unit sets a start position for rotating the main spindle to which the other tap is mounted based on the phase difference, and continuously performs the female thread processing from the start position.

With the first configuration of the disclosure, since the relation between the rotation angle and the existence of the screw thread is acquired by measuring the position of the screw thread of the tap with the sensor while rotating the tap, the tap phase can be detected with a facilitated method without using a dedicated device.

With the second and third configurations of the disclosure, by using the tap phase detection method of the first configuration, the phase of the reference tap before the halt and the phase of the other tap after the halt can be easily matched. Accordingly, the female thread processing can be continuously performed after the female thread processing is halted. Since a sequence of the operations of the phase detection and the phase correction of the tap is completed in the machining center, the operations can be automated by the processing program without an operator.

DETAILED DESCRIPTION OF THE INVENTION

The following describes embodiments of the disclosure based on the drawings.

Figure 1:
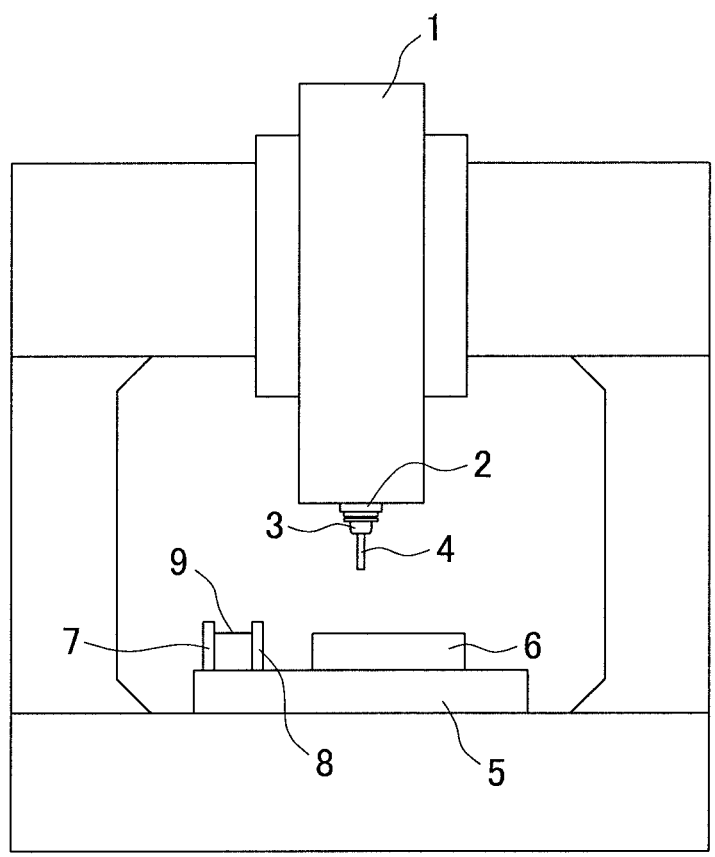
FIG. 1 is a schematic diagram of a machining center of one embodiment.
Figure 1:
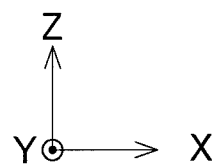

FIG. 1 illustrates and describes a machining center as an example of a machine tool. The machining center includes a spindle head 1 configured to perform an orthogonal three-axis operation. The spindle head 1 includes a rotatable main spindle 2, and a tool holder 3 is mounted to a distal end portion of the main spindle 2. The tool holder 3 grips a tap 4. The machining center includes a control device, which is not illustrated, to control a rotation of the main spindle 2 and a feed operation of the spindle head 1, and performs a female thread processing to a workpiece 6 secured to a table 5 with the tap 4.

On the table 5, a laser light irradiation device 7 that emits a laser light 9 in the X-axis direction and a laser light detection device 8 are installed at mutually opposed positions. The laser light detection device 8 is a device configured to detect existence of the laser light 9 emitted from the laser light irradiation device 7, and configured to detect an existence of an object blocking the laser light 9 between the laser light irradiation device 7 and the laser light detection device 8. The laser light irradiation device 7 and the laser light detection device 8 are connected to the control device, and can be controlled in synchronization with the machining center. While FIG. 1 does not illustrate a position at which the measurement of the tap 4 is performed with the laser light 9 because FIG. 1 is a schematic diagram illustrating an overall view, the spindle head 1 moves to a position at which the laser light 9 is irradiated on a screw thread of the tap 4 when the phase detection of the tap 4 is performed. The control device has a function of calculating the phase of the tap 4 from a relation between the phase of the main spindle 2 and the detection of the laser light 9, and is configured to execute operations of the reference phase acquisition unit, the measurement phase acquisition unit, the phase difference calculation unit, and the processing unit of the disclosure. The control device includes a central processing unit (CPU) and a memory connected to the CPU and ensures the operations.

Figure 2:
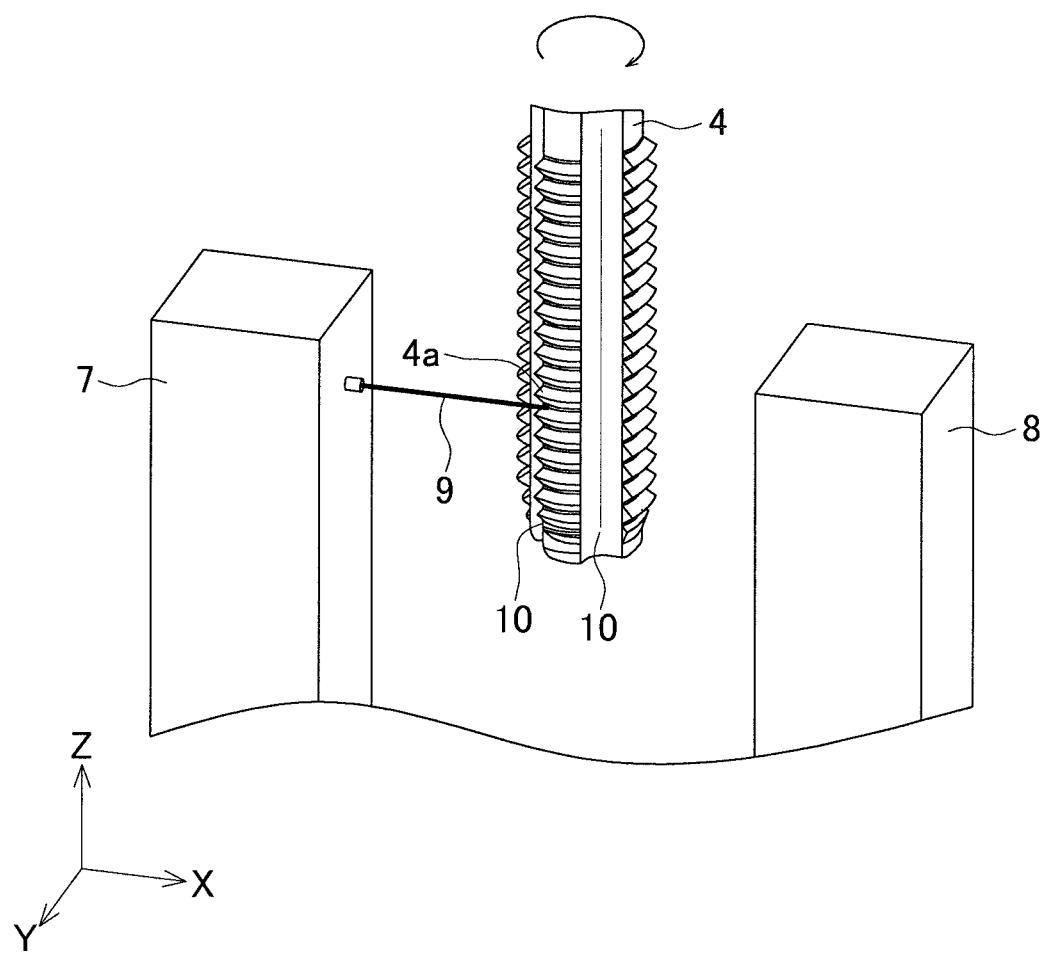
FIG. 2 is an explanatory view illustrating a relation between a tap and a laser light.

FIG. 2 is a bird's eye view illustrating enlarged tap 4 and laser light 9 when the phase detection of the tap 4 is performed. The tap 4 is provided with flutes 10 in the axial direction for discharging swarf, and in the embodiment, the four flutes 10, 10 . . . are evenly provided. The laser light 9 in FIG. 2 is blocked because the laser light 9 is irradiated on a screw thread 4*a* of the tap 4, and the laser light 9 is not detected by the laser light detection device 8. Then, when the tap 4 is gradually rotated by the rotation of the main spindle 2, the laser light 9 passes through a position around a root of thread of the tap 4, and is detected by the laser light detection device 8 without being blocked. The laser light 9 is also detected when passing through a position of the flute 10 of the tap 4.

Figure 3:
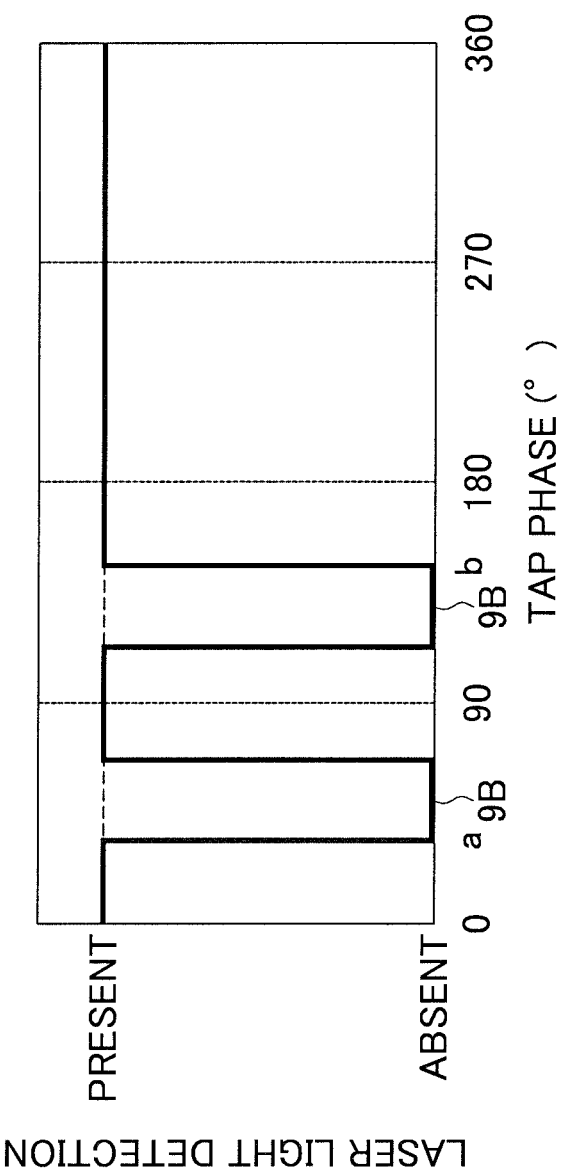
FIG. 3 is an explanatory view illustrating a relation between a phase of a reference tap and an existence of a screw thread detected by the laser light.

FIG. 3 illustrates an example of measurement waveform indicating a relation between the phase of the tap 4 and the laser light detection by the laser light detection device 8. The measurement waveform is uniquely determined by the phase of the tap 4 when mounted to the tool holder 3 and the main spindle 2. A phase difference between a tap as a measurement target and a reference tap is indicated as a shift amount in a right-left direction of the measurement waveform.

Accordingly, the phase difference of the tap can be corrected by the shift amount from a reference waveform. Additionally, the phase can be obtained from a feature point of the measurement waveform. For example, in FIG. 3, since a value in the center between the phases a and b is a phase at the crest of a screw thread, the phase difference of the tap can be calculated from the phase of the crest of the screw thread.

Next, a relation between the phase of the tap 4 and the measurement waveform will be described in detail. For convenience, a relative position between the tap 4 and the laser light 9 is inverted, and the description will be given assuming that the tap 4 is fixed and the laser light 9 rotates around the tap 4.

Figure 4:
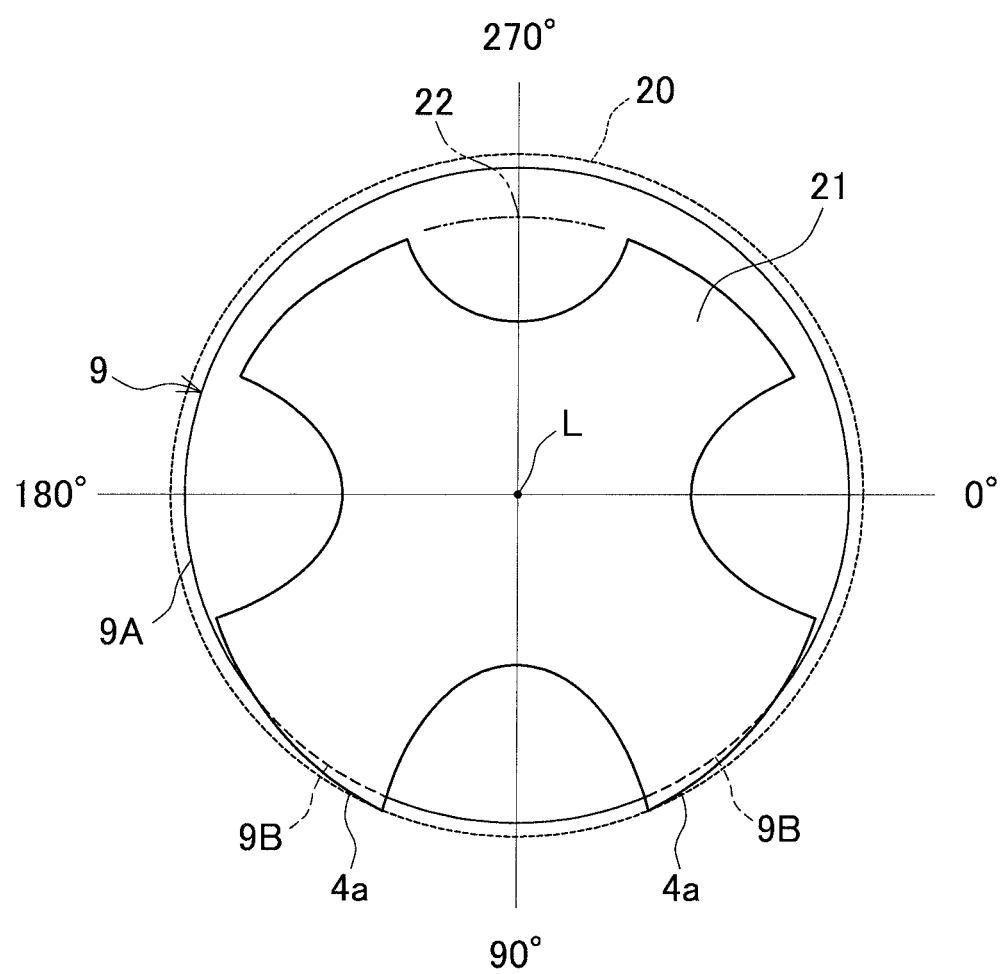
FIG. 4 is an explanatory view illustrating a relation between the laser light and the tap.

FIG. 4 is a projection drawing of a cross-sectional surface of the tap 4 taken along a surface irradiated with the laser light 9 projected on a surface perpendicular to an axis line L of the tap 4. While a projection drawing 20 of an outer shape of the tap 4 has a circular shape having the center on the axis line L of the tap 4, a projection drawing 21 of a cross-sectional surface of the screw thread 4a of the tap 4 is not rotation symmetry because of its spiral shape.

Here, by setting a distance between a straight line of the laser light 9 and a straight line formed by the axis line L of the tap 4 to a value between a half of an outer diameter of the tap 4 and a half of a diameter of the root of thread, the laser light 9 passes through around the root of thread or is blocked by the screw thread 4a by the rotation of the tap 4. In FIG. 4, between the projection drawing 20 of the outer diameter of the tap 4 and a position 22 of a bottom of the root, a circular shape formed by the laser light 9 is illustrated, a shape through which the laser light 9 can pass without irradiation on the screw thread 4a is illustrated as a passing portion 9A indicated by a solid line, and a shape in which the laser light 9 is irradiated on the screw thread 4a to be blocked is illustrated as a blocking portion 9B indicated by a dotted line.

FIG. 3 illustrates the state of the laser light 9 as a measurement waveform detected by the laser light detection device 8. Here, a pair of the blocking portions 9B, 9B are detected having a phase of 90° as the center.

Figure 5:
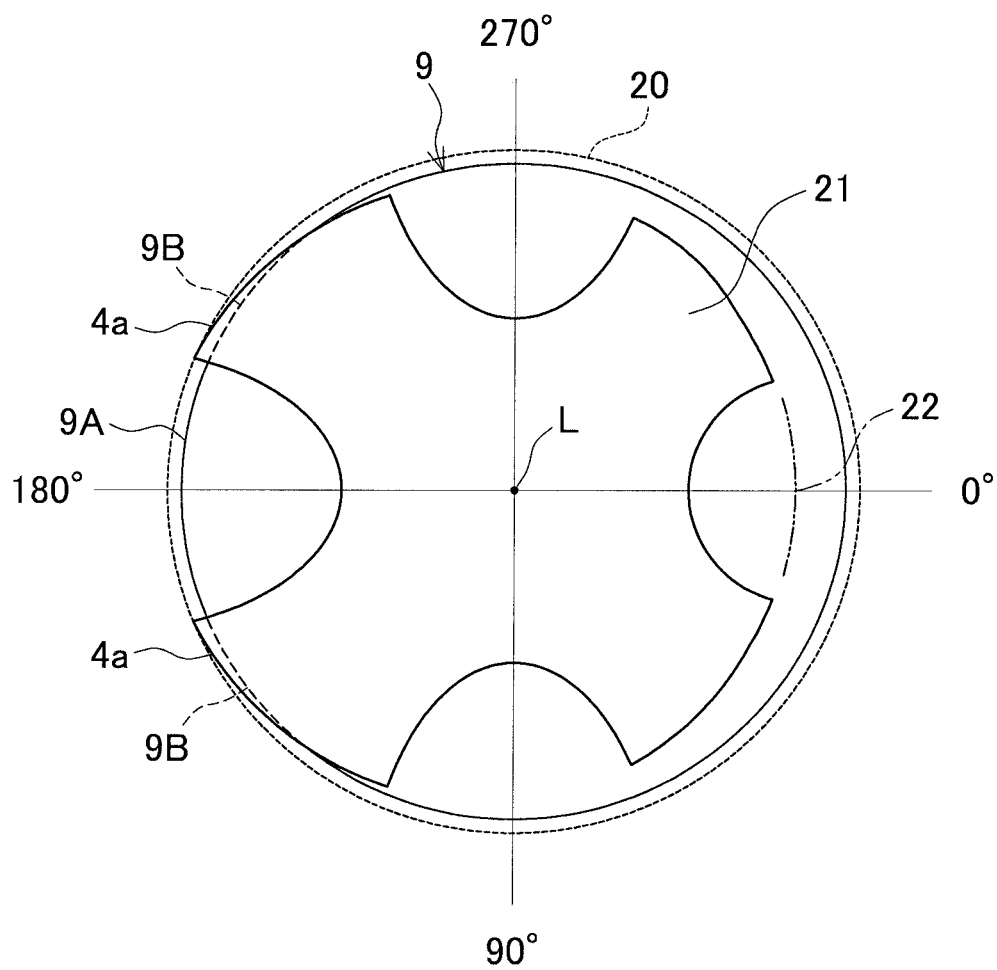
FIG. 5 is an explanatory view illustrating a relation between a laser light and a tap for another tap.
Figure 6:
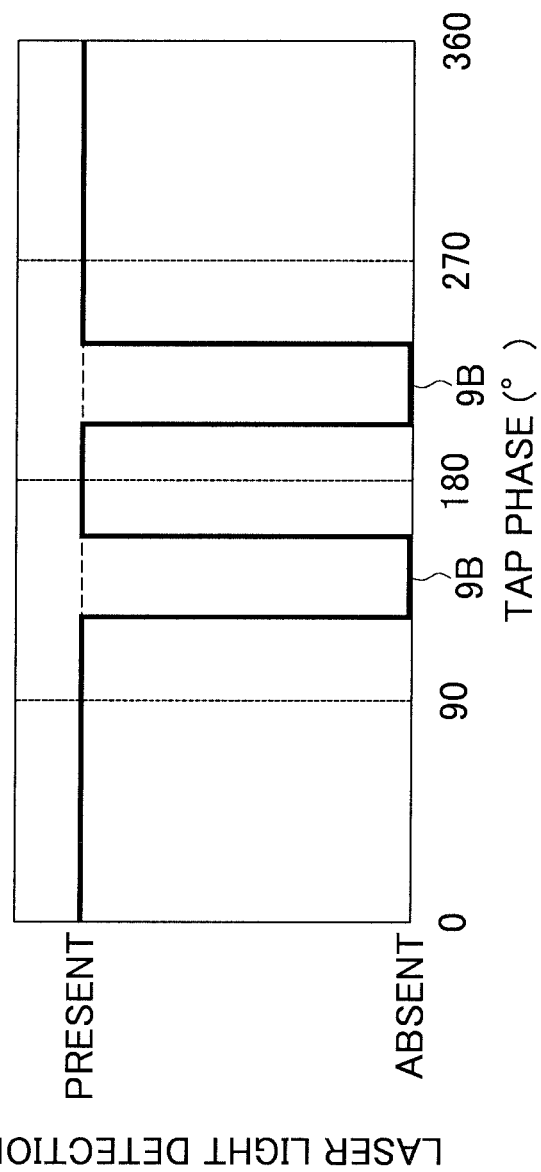
FIG. 6 is an explanatory view illustrating a relation between a phase of the other tap and an existence of a screw thread detected by the laser light.

With the measurement waveform of FIG. 3 as a reference waveform, for example, when another tap 4 of second and following taps is rotated with respect to the state of FIG. 4 by 90° as illustrated in FIG. 5, in the detected measurement waveform, a pair of the blocking portions 9B, 9B are detected having a phase of 180° as the center as illustrated in FIG. 6. Since the measurement waveform is a diagram in which the phase of the reference waveform of FIG. 3 is shifted to the right side, the phase difference between the first tap 4 and the second and following taps 4 can be obtained from the shift amount.

Figure 7:
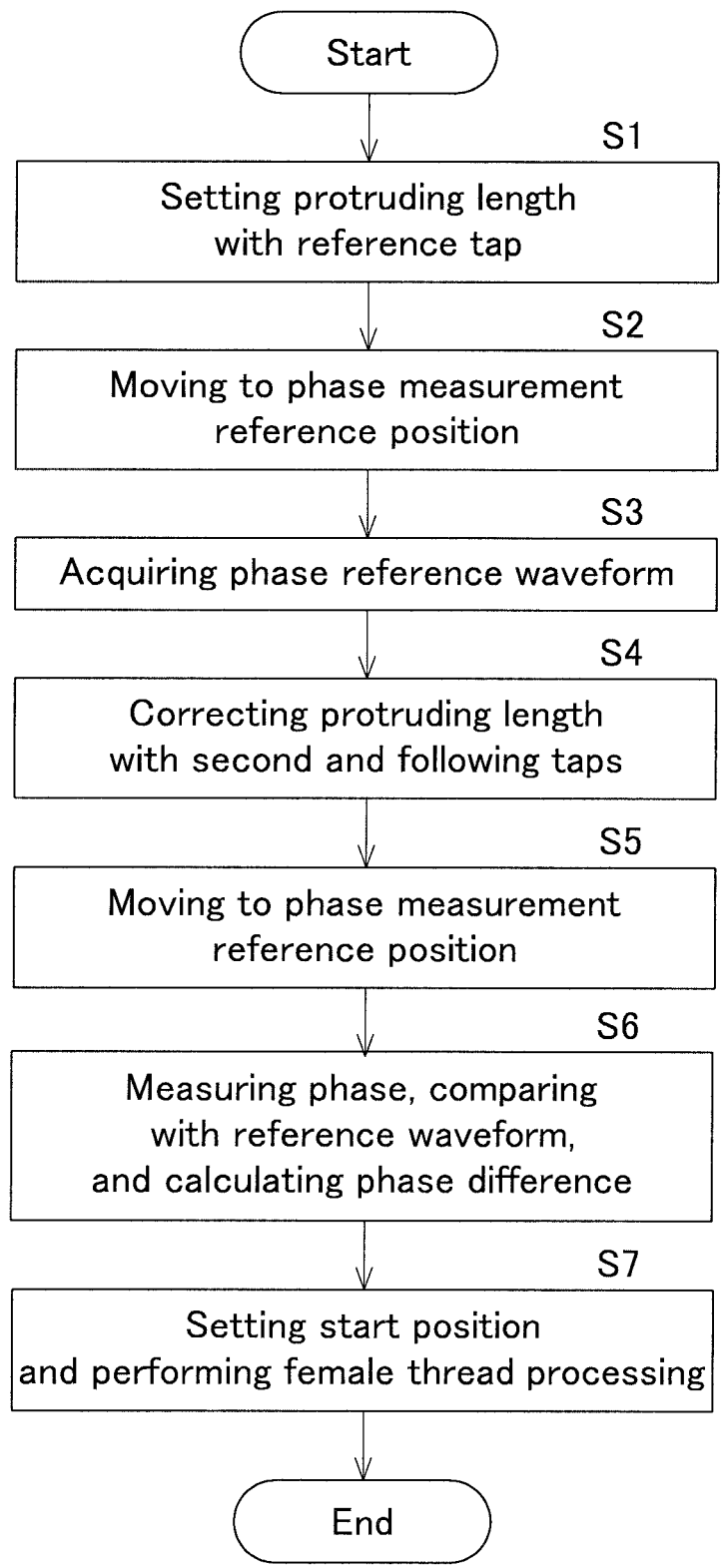
FIG. 7 is a flowchart of a female thread processing method.

Next, a specific female thread processing method by the machining center will be described with reference to a flowchart of FIG. 7.

First, a protruding length is set while having a first tap as a reference tap before halting the female thread processing (S1).

Next, the spindle head 1 is moved in the Z-axis direction by a preset length, and the spindle head 1 is moved in the X-axis direction and the Y-axis direction such that the laser light 9 alternately is irradiated on the position of the screw thread 4a and passes through the position around the root of the thread of the first tap 4 by rotating the main spindle 2, thereby setting the reference position of the phase measurement (S2).

Next, by rotating the main spindle 2, a measurement waveform indicating a relation between the phase of the first tap 4 and the laser light detection is acquired as described above, thus acquiring a reference of the phase (S3), which is reference phase acquisition step.

Then, female thread processing is performed using the reference tap, and another tap is used when the processing is halted due to a breakage or the like of the reference tap. In this case, for the other tap 4 of the second and following taps, first, the protruding length is corrected so as to match the protruding length of the reference tap (S4), and then, the spindle head 1 is moved in the X-axis direction, Y-axis direction, and Z-axis direction to the reference position of the phase measurement set by the reference tap (S5).

Then, a measurement waveform indicating a relation between the phase of the other tap 4 and the laser light detection is acquired here, and the phase difference from the reference waveform acquired in S3 is calculated (S6), which are measurement phase acquisition step and phase difference calculation step.

Based on the phase difference acquired as described above, a start position for rotating the main spindle 2 to which the other tap 4 is mounted is set, and the female thread processing is continuously performed from the start position (S7), which is processing step.

In the processing step, specifically, the phase difference acquired in S6 is set to the control device as a phase correction amount of the other tap 4. The control device sets the rotation angle as a start position to rotate the main spindle 2 to a rotation angle shifted by the phase correction amount from a rotation halted angle as a rotation angle at which the female thread processing is halted. Accordingly, the female thread processing can be continued with the phase the same as that of the reference tap.

As another example of the processing step, a method in which, instead of inputting the phase correction amount, a phase shifted from a processing start main spindle phase in the halted female thread processing by the phase difference is set as a new processing start main spindle phase in a processing program that commands a processing operation of the machine tool may be employed. In this case, when the control device reads a new processing start main spindle phase from the processing program, the control device rotates the main spindle 2 having the new processing start main spindle phase as the start position, and therefore, the female thread processing can be performed with the same phase as that of the reference tap.

Thus, in the tap phase detection method in the above-described embodiment, the relation between the rotation angle and the existence of the screw thread 4a is acquired by measuring the position of the screw thread 4a of the tap 4 with the laser light irradiation device 7 and the laser light detection device 8, from the direction intersecting with the axial direction of the tap 4 while rotating the tap 4. Then, the phase of the tap 4 is detected based on the acquired relation between the rotation angle and the existence of the screw thread 4a.

With the configuration, the tap phase can be detected with a facilitated method without using a dedicated device.

Especially, since the sensor includes the laser light irradiation device 7 that emits the laser light 9 to the position of the screw thread 4a and the laser light detection device 8 that detects the emitted laser light 9, there is no possibility of damaging the tap 4 and the sensor even when the screw thread 4a is measured.

Then, in the female thread processing method and the machining center of the above-described embodiment, the relation between the rotation angle of the main spindle 2 and the existence of the screw thread is preliminarily acquired for the reference tap before the halt by the sensor. After the halt, the relation between the rotation angle of the main spindle 2 and the existence of the screw thread is acquired for the other tap, and the phase difference between the reference tap and the other tap is calculated. Then, the start position of the female thread processing is set based on the phase difference, thereby continuing the female thread processing.

With the configuration, the phase of the reference tap before the halt and the phase of the other tap after the halt can be easily matched. Accordingly, the female thread processing can be continuously performed after the female thread processing is halted. Since a sequence of the operations of the phase detection and the phase correction of the tap is completed in the machining center, the operations can be automated by the processing program without an operator.

The sensor may be another non-contact sensor, and a contact sensor can be employed insofar as the screw thread of the tap can be measured. The shape of the tap is also not limited to the above-described configuration. For example, the number of the flutes may be larger or smaller than that of the above-described configuration.

The machine tool is not limited to the machining center insofar as the female thread processing by the tap can be performed.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A tap phase detection method comprising:
   acquiring a relation between a rotation angle and an existence of a screw thread by detecting existence of the screw thread at a position where the screw thread and a root of thread of a tap pass through with a sensor from a direction intersecting with an axial direction of the tap while rotating the tap; and
   detecting a phase of the tap based on the acquired relation between the rotation angle and the existence of the screw thread.

2. The tap phase detection method according to claim 1, wherein:
   the sensor includes a laser light irradiation device that emits a laser light to a position where the screw thread and the root of thread of the tap pass through and a laser light detection device that detects the emitted laser light.

3. A female thread processing method in which halted female thread processing is continuously performed with a tap mounted to a main spindle of a machine tool, the method comprising:
   preliminarily acquiring a relation between a rotation angle of the main spindle and an existence of a screw thread of a reference tap as a tap before a halt by mounting the reference tap to the main spindle, and detecting existence of the screw thread at a position where the screw thread and a root of thread of the reference tap pass through with a sensor from a direction intersecting with an axial direction of the reference tap while rotating the main spindle;
   acquiring a relation between a rotation angle of the main spindle and an existence of a screw thread of an other tap for continuing the female thread processing by mounting the other tap to the main spindle and detecting existence of the screw thread at a position where the screw thread and a root of thread of the other tap pass through with the sensor while rotating the main spindle;
   calculating a phase difference between the reference tap and the other tap based on the relation between the rotation angle and the existence of the screw thread acquired in the preliminarily acquiring and the relation between the rotation angle and the existence of the screw thread acquired in the acquiring of the relation; and
   setting a start position for rotating the main spindle to which the other tap is mounted based on the phase difference, and continuously performing the female thread processing from the start position.

4. The female thread processing method in a machine tool according to claim 3, wherein
   in the setting, the phase difference calculated in the calculating of the phase difference is set as a phase correction amount, and the main spindle is rotated having a rotation angle shifted by the phase correction amount from a rotation halted angle of the main spindle in the halted female thread processing as the start position.

5. The female thread processing method in a machine tool according to claim 3, wherein
   in the setting, based on a processing start main spindle phase in a processing program of a control device of the machine tool in the halted female thread processing and the phase difference calculated in the calculating of the phase difference, a new processing start main spindle phase is set to the processing program, and the main spindle is rotated having the new processing start main spindle phase as the start position.

6. The female thread processing method in a machine tool according to claim 3, wherein
   the sensor includes a laser light irradiation device that emits a laser light to a position where the screw thread and the root of thread of the tap pass through and a laser light detection device that detects the emitted laser light.

7. A machine tool for continuously performing halted female thread processing with a tap mounted to a main spindle, the machine tool comprising:
   a sensor configured to detect existence of a screw thread at a position where the screw thread and a root of thread of the tap pass through from a direction intersecting with an axial direction of the tap mounted to the main spindle;
   a reference phase acquisition unit that acquires a relation between a rotation angle of the main spindle and an existence of the screw thread of a reference tap as a tap before a halt by detecting existence of the screw thread at a position where the screw thread and a root of thread of the reference tap pass through with the sensor while rotating the main spindle in a state where the reference tap is mounted to the main spindle;
   a measurement phase acquisition unit that acquires a relation between a rotation angle of the main spindle and an existence of a screw thread by mounting an other tap for continuing the female thread processing to the main spindle and detecting existence of the screw thread at a position where the screw thread and a root of thread of the other tap pass through with the sensor while rotating the main spindle;

a phase difference calculation unit that calculates a phase difference between the reference tap and the other tap based on the relation between the rotation angle and the existence of the screw thread acquired by the reference phase acquisition unit and the relation between the rotation angle and the existence of the screw thread acquired by the measurement phase acquisition unit; and a processing unit that sets a start position for rotating the main spindle to which the other tap is mounted based on the phase difference, and continuously performs the female thread processing from the start position.

\* \* \* \* \*